July 27, 1943.  J. E. CLEVE  2,325,476
ILLUMINATING MIRROR
Filed Dec. 15, 1939
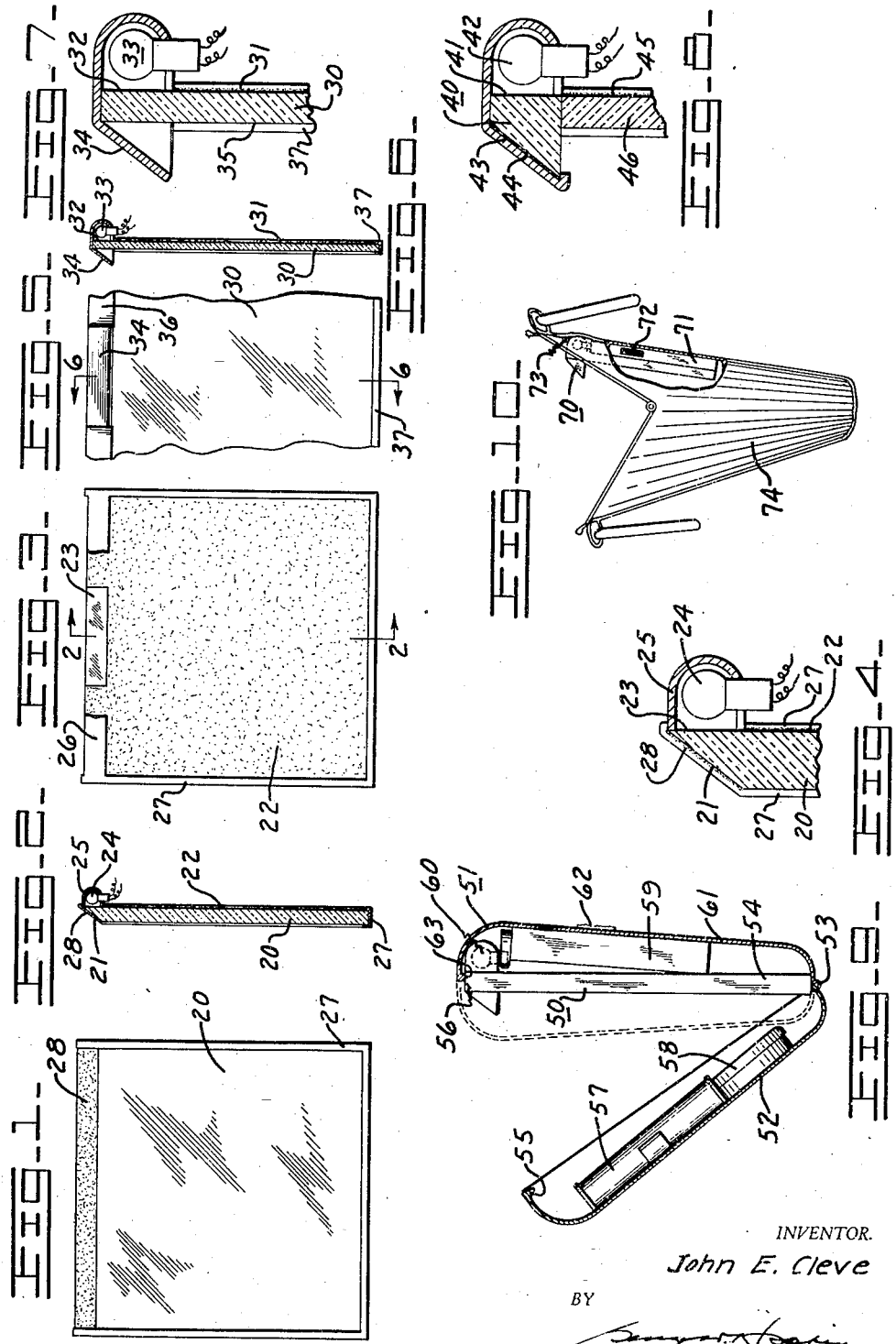
INVENTOR.
John E. Cleve
BY
ATTORNEY.

Patented July 27, 1943

2,325,476

UNITED STATES PATENT OFFICE 2,325,476

ILLUMINATING MIRROR

John E. Cleve, Hayward, Calif.

Application December 15, 1939, Serial No. 309,401

1 Claim. (Cl. 240—4.2)

My invention relates to mirrors, particularly mirrors of various sizes which are used for viewing the person.

The object of my invention is to provide a mirror in combination with a source of light which is utilized to illuminate the person viewing himself in the mirror by means of the reflecting surface of the mirror itself.

Another object is to provide an illuminating mirror which can be constructed as a unit which can be carried in a small case or mounted on the side of a handbag.

Other objects will appear after a disclosure of devices embodying the invention when it will become apparent that such illuminating mirrors can be constructed to have a wide variety of uses.

In the drawing:

Fig. 1 is a front elevation of one embodiment of my invention.

Fig. 2 is a vertical transverse section thereof, as indicated by the arrows 2—2 in Fig. 3.

Fig. 3 is a rear view thereof with a part broken away.

Fig. 4 is an enlarged view of the upper portion of Fig. 2.

Fig. 5 is a fragmentary front elevation of a second embodiment of my invention.

Fig. 6 is a vertical transverse section thereof, as indicated by the arrows 6—6 in Fig. 5.

Fig. 7 is an enlarged view of the upper portion of Fig. 6.

Fig. 8 is a view similar to Fig. 7 of a third embodiment of my invention.

Fig. 9 is a vertical section of a case with an illuminating mirror of my invention mounted therein.

Fig. 10 is a view of a handbag showing one of my illuminating mirror units mounted therein.

The embodiment disclosed in Figs. 1 to 4 will be described first. It comprises a plate of glass 20 having a beveled edge 21. The rear face of the glass is silvered as indicated at 22. The entire rear surface is provided with this reflecting surface except for the area 23 which acts as a window through which rays of light from the lamp 24 pass. The lamp 24 is suitably mounted in a reflector 25 formed in or attached to a strip of metal 26 which extends across the top of the glass and is attached to or merges with the sheet metal binding 27 which encompasses the edges of the glass as a protecting frame. The beveled edge 21 of the glass is also silvered to give it a reflecting surface as indicated at 28.

The operation of this device is as follows: Rays of light issuing from the lamp 24 are directed with the aid of the reflector 25 through the window 23 onto the reflecting surface 28 of the beveled edge 21 from which the rays of light are reflected downwardly through the glass onto the reflecting rear surface 22 from which they are reflected through the front of the glass 20 onto the person viewing himself in the mirror and thus provide an illumination by means of which he may view himself. In this manner the mirror performs the double function of reflecting the illumination and also the image of the person. The source of illumination remains concealed so that no annoying glare of light is received in the person's eyes.

In the embodiment disclosed in Figs. 5 to 7 I employ a relatively thinner plate or sheet of glass 30 which is silvered on the rear face 31 except for a window 32 to permit the rays of light from the lamp 33 to pass through to a reflector 34 which can be constructed of metal and arranged at an angle to the front surface or plane 35 of the glass. Preferably the reflector 34 is formed integrally with a strip 36 extending across the top of the glass which strip is part of the frame 37.

The principle of operation of this embodiment is substantially identical with that of the first embodiment. Its advantage is that it permits use of thinner glass to reduce weight and also provides a more economical construction.

The third embodiment disclosed in Fig. 8 contemplates the use of a prismatic section of glass 40 the rear face 41 of which is clear to admit rays of light from the lamp 42. The front inclined face 43 is silvered as indicated at 44 to reflect the rays down onto the silvered rear surface 45 of the mirror glass 46. The prismatic section 40 may be separate from the glass 46 or cast integrally therewith. This construction obtains a greater diffusion of light over the mirror surface 45.

While I have shown a reflecting surface at the top edge of the mirror in these embodiments it will be obvious that the reflecting surface could be at any or all edges of the glass, or positioned centrally thereof. Also, the glass could be of any size or shape.

However, one of the preferred applications of my illuminating mirror is in a small unit construction such as that indicated generally at 50 in Fig. 9 where it is contained in a small case or compact 51 having a front cover 52 hinged at 53 to the bottom of the frame 54 of the mirror unit and provided with a catch 55 for engaging in a depression 56 in the top of the frame 54. Make-up accessories, such as lip stick 57 and rouge or powder 58 can be carried inside the front cover 52. A battery 59 for lighting the lamp 60 in the mirror unit 50 can be mounted on the back cover 61 and provided with a switch indicated at 62 for turning the lamp on and off. The back cover 61 is also hinged at 53 and provided with a catch 63 for engaging in the depression 56.

Another application of a small mirror unit is shown in Fig. 10 where the mirror unit 70 having a battery 71 attached to the back thereof and provided with a switch 72 can be attached as by a pin 73 to the inner side of a handbag 74.

The advantages and utility of these applications are thought to be obvious. Such a device is of great convenience to women who desire the use of a mirror at night in conditions of darkness or semi-darkness where adequate illumination is not available. The use of a concealed source of light is particularly desirable since it enables the use of mirror and make-up unobtrusively in public places, such as in a bus.

Having disclosed my invention and the manner in which it is to be used, I claim:

An illuminating mirror construction comprising, a plate glass mirror, means at the margin of said mirror to provide a flat reflecting surface disposed in front of and at a fixed angle to the rear face of said mirror, a source of light disposed behind said mirror in alignment with said flat reflecting surface and a housing for said source of light supported so as to have the rays from said source of light issue forwardly onto said reflecting surface, said surface reflecting substantially all said rays rearwardly into said mirror, said mirror reflecting said rays forwardly onto the face of the person viewing himself in said mirror, said rays reflected from said mirror being the only rays which reach the person's face from said source of light.

JOHN E. CLEVE.